Oct. 22, 1946.  G. P. LESSMANN  2,409,874
BEARING CONSTRUCTION
Filed July 28, 1943
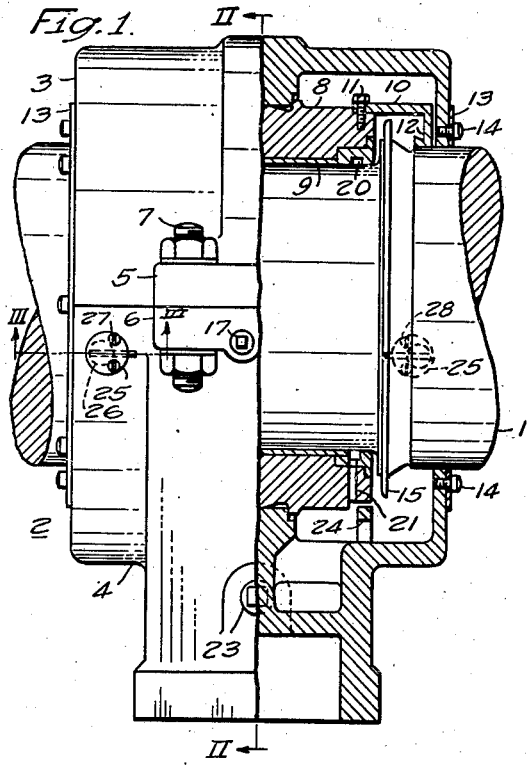
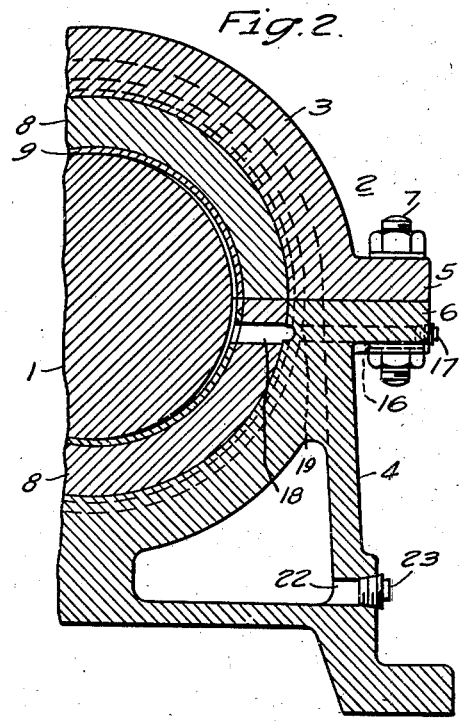
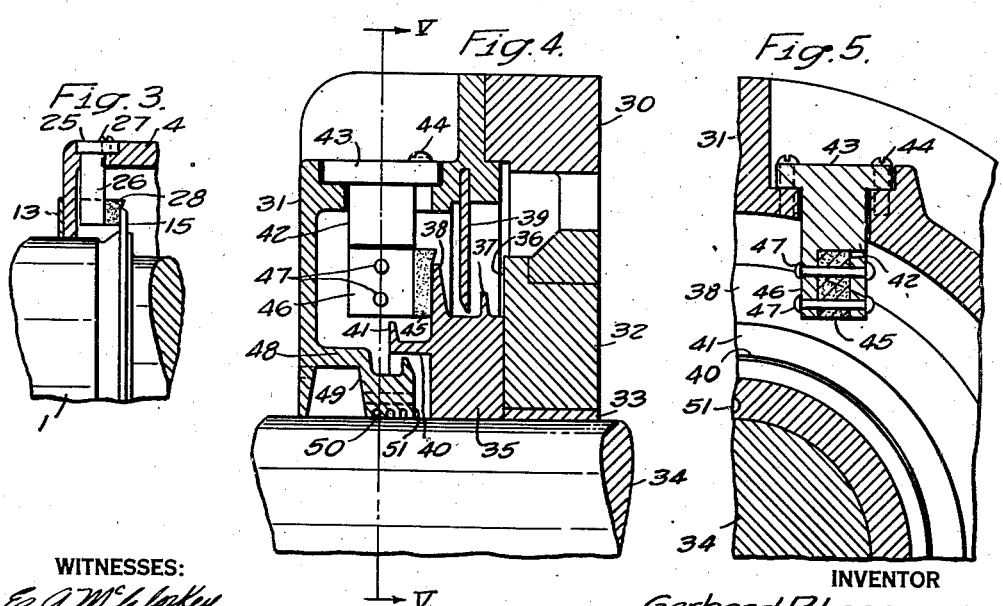
WITNESSES:
INVENTOR
Gerhard P. Lessmann
BY O. B. Buchanan
ATTORNEY Patented Oct. 22, 1946

2,409,874

UNITED STATES PATENT OFFICE 2,409,874

BEARING CONSTRUCTION

Gerhard P. Lessmann, Wilkinsburg, Pa., assignor to Westinghouse Electric Corporation, East Pittsburgh, Pa., a corporation of Pennsylvania Application July 28, 1943, Serial No. 496,403

6 Claims. (Cl. 308—36.5)

1

The present invention relates to bearings for rotating shafts, and more particularly to a bearing construction which is designed to prevent leakage of oil from the bearing along the shaft under any conditions of operation.

The bearing construction of the present invention is especially adapted for the bearings of electric motors and generators used in submarines, although its usefulness is not restricted to this particular application, since it may be used on other types of rotating machines where similar problems are encountered. Submarine motors and generators often operate at relatively low speeds and with frequent starts and stops, and often with the shafts inclined from the horizontal position. With the usual designs of bearings which have been available heretofore, it has been found that it is practically impossible to prevent leakage of oil from the bearing along the shaft at low speeds and in inclined positions. This is chiefly due to the fact that at low speeds the oil throwers usually provided within the bearing housing do not throw off all the oil escaping from the bearing, since the centrifugal force at the periphery of the oil thrower is not great enough at low speed to throw off all the oil, and a certain amount of it travels over the oil thrower and escapes from the bearing housing in a continuous stream along the shaft. This oil leakage is, of course, highly objectionable, but no satisfactory means has been available for preventing it under the conditions of operation mentioned, which are frequently encountered in submarine service.

The principal object of the present invention is to provide a bearing construction in which leakage of oil from the bearing housing along the shaft is completely prevented under all conditions of operation.

A more specific object of the invention is to provide a bearing construction in which oil throwers are provided adjacent the bearing for throwing off oil escaping along the shaft, and in which additional means are provided for removing any oil which may travel over the oil throwers without being thrown off, so that leakage of oil from the bearing housing is entirely prevented under all conditions.

Other objects and advantages of the invention will be apparent from the following detailed description, taken in connection with the accompanying drawing, in which:

Figure 1 is a side elevation, partly in longitudinal section, of a bearing construction embodying the invention, Fig. 2 is a partial transverse section, approximately on the line II—II of Fig. 1, Fig. 3 is a fragmentary sectional view, approximately on the line III—III of Fig. 1, Fig. 4 is a longitudinal sectional view of one end of a bearing construction showing another embodiment of the invention, and Fig. 5 is a fragmentary transverse sectional view, approximately on the line V—V of Fig. 4.

A preferred embodiment of the invention is shown in Figs. 1, 2 and 3, which show a bearing construction for supporting a rotatable shaft 1. The construction includes a bearing housing 2 which consists of a bearing cap 3 and a pedestal member 4. The cap 3 and pedestal 4 have cooperating flanges 5 and 6, respectively, which are adapted to engage each other, and the cap is secured to the pedestal by means of bolts 7 which pass through the flanges 5 and 6. The bearing 8 is supported in the bearing housing 2 in any suitable manner, and is preferably divided into two halves for ease of assembly, as shown in Fig. 2. The bearing 8 has a bearing surface 9 of Babbitt metal, or other suitable bearing alloy, on which the shaft 1 is supported for rotation. An oil catcher 10 may be secured to one end of the bearing 8 by screws 11. The oil catcher 10 is shown as being semicircular, extending down to the horizontal center line of the bearing on each side, and has an internal gutter portion 12. The ends of the housing 2 may be closed by seal rings 13 which encircle the shaft 1 with a small clearance and which are secured to the housing 2 in any suitable way as by screws 14. The shaft 1 has an oil thrower 15 on each side of the bearing 8 and closely adjacent to the bearing. As shown in the drawing, each oil thrower 15 is preferably a radial flange formed integral with the shaft, and is of sufficient diameter to throw off any oil reaching it along the shaft when the shaft is rotating at normal operating speed.

Oil is supplied to the bearing surface 9 through oil passages 16 formed in the flanges 6 on both sides of the bearing pedestal 4. The oil passages 16 are shown closed by plugs 17, but it will be understood that oil will normally be supplied to these passages by means of oil cups, or by connection with a suitable oiling system, or in any usual or desired manner. Each oil passage 16 extends through the bearing pedestal 4 toward the shaft 1 in a direction slightly inclined from the perpendicular to the shaft, and communicates with an oil duct 18 in the bearing 8, through which the oil is fed to the bearing surface 9. A V-groove 19 may be formed at the junction between the bearing cap 3 and the pedestal 4 to prevent creepage of oil through the housing split between the cap and pedestal.

The bearing surface 9 has an oil groove 20 cut in it adjacent each end to catch oil flowing along the shaft. The oil groove 20 at each end of the bearing has a drain hole which communicates with a drainage passage 21 extending through the bearing 8, through which oil can drain into the base of the pedestal 4. Oil draining into the pedestal 4 may be removed through a drainage opening 22 which may be closed by a plug 23.

In operation, oil is fed through the oil passages 16, and ducts 18 to the bearing surface 9, and flows longitudinally between the shaft 1 and bearing surface 9. Most of the oil thus passing through the bearing is caught by the grooves 20 at the opposite ends, and drains into the base of the pedestal 4 through the drainage openings 21. A certain amount of the oil, however, will get past the grooves 20 and escape from the ends of the bearing along the shaft. When the shaft is rotating at normal speed, this oil will be completely thrown off by the oil throwers 15, because of the centrifugal force developed at the outer periphery of the oil thrower, and will drain to the bottom of the pedestal 4 through drainage openings 24. Oil thrown off at the top of the oil thrower is caught in the gutter 12 of the oil catcher 10, from which it drains into the bottom of the pedestal 4. In this way, oil thrown off at the top of the oil thrower is prevented from dripping back onto the shaft.

When the shaft is rotating at a reasonably high speed and in the horizontal position, substantially all of the oil escaping from the bearing is thrown off by the oil thrower 15 and no leakage of oil along the shaft from the bearing housing occurs. When the shaft is rotating at low speed, however, the centrifugal force at the periphery of the oil thrower 15 is correspondingly reduced, and it may not be great enough to throw off all of the oil reaching the oil thrower, so that a substantial portion of this oil will remain on the oil thrower and will travel over it and along the shaft. This condition is aggravated if the shaft is in an inclined position, and even at fairly high speeds some oil may get past the oil thrower if the shaft is not horizontal. When the shaft is inclined, there is also a tendency for oil to escape from the bearing and travel over the oil thrower even when the shaft is at rest. These conditions of low-speed operation and inclined position of the shaft are frequently encountered in submarine service, and considerable leakage of oil occurs under these conditions if no provision for preventing such leakage is made other than an oil thrower on the shaft.

The bearing construction of the present invention provides an additional means for removing any oil which gets past the oil thrower under any conditions of operation. This means preferably consists of one or more oil wipers 25 placed adjacent the oil thrower on the side away from the bearing. In the preferred embodiment of the invention shown in Figs. 1 through 3, four of these oil wipers are used, one on each side of the shaft adjacent each of the two oil throwers at opposite ends of the bearing. Each oil wiper consists of a stud 26 secured in the bearing housing 2 by screws 27, and a piece of heavy wool felt 28, or other suitable material, which is secured in the stud 26 and engages the radial face of the oil thrower 15 on the side of the oil thrower away from the bearing.

In operation, any oil which passes over the oil thrower 15 without being thrown off, either because of the slow speed or inclined position of the shaft, or for any other reason, travels down the outward radial surface of the oil thrower 15 and is wiped off by the oil wiper 25, so that it is prevented from reaching the shaft and travelling along it out of the bearing housing. Oil wiped off the oil thrower 15 in this manner drains to the bottom of the bearing pedestal 4 through the opening 24 along with the oil thrown off the shaft by the oil thrower 15. The oil wipers 25 are preferably mounted in the pedestal 4 below the horizontal central plane of the shaft, so that oil wiped off by the wipers 25 cannot drip back onto the shaft. Any oil which travels over the oil thrower 15 when the shaft is at rest in an inclined position is wiped off the oil thrower as soon as the shaft starts to rotate. Thus, leakage of oil is prevented even though the shaft operates at low speeds for along periods of time, or in an inclined position, or with frequent starts and stops. It will be apparent, therefore, that a construction has been provided which effectively prevents leakage of oil from the bearing housing along the shaft under any conditions of operation.

A more elaborate embodiment of the invention is shown in Figs. 4 and 5. These figures show a combined thrust and journal bearing which is supported in a bearing housing 30 of any suitable construction, which may be substantially similar to that of the bearing housing shown in Figs. 1 and 2, and which is closed at the end by an end cover 31. Both ends of the bearing may be identical and only one end of the bearing has been shown in the drawing. The bearing 32 is supported in any suitable manner in the housing 30, and has a bearing surface 33 of Babbitt metal, or other suitable bearing alloy. The shaft 34, which is supported in the bearing 32 for rotation, has a thrust collar or thrust ring 35 rigidly secured to it, or integral with it, which engages a thrust surface 36 on the end of the bearing 32 to support the shaft 34 against end thrust. The thrust collar 35 has a radial flange 37 integral with it adjacent the end of the bearing 32, and a second integral radial flange 38 at the opposite end of the thrust collar and of greater diameter than the flange 37. A stationary annular baffle 39 is secured in the end cover 31, and encircles the thrust collar 35 with a small running clearance with the thrust collar in the space between the two radial flanges or oil throwers 37 and 38. An oil through 40 is formed integrally with the thrust collar 35 on the outer end thereof and has a radial lip 41 which functions as an oil thrower.

An oil wiper 42 is mounted in the end cover 31 adjacent the end of the thrust collar 35. The oil wiper 42 may consist of a stud 43 which is secured in the end cover 31 by means of screws 44. A piece of heavy wool felt 45, or similar material, is secured to the stud 43 by means of a clamping piece 46 and rivets 47, in such a position that the felt 45 engages the outer surface of the thrust collar 35, as shown in Fig. 4.

The end cover 31 which closes the end of the bearing housing 30 has an inwardly extending annular projection 48 which encircles the shaft, and which has an annular recess 49 formed in it to function as an oil trough. The cover 31 encircles the shaft 34 with a small running clearance, and may be provided with a labyrinth 50, and with an air bypass 51 to equalize the air pressure, so that there will be no suction effect to draw oil vapors out of the bearing.

In operation, oil may be supplied to the clearance between the bearing surface 33 and shaft 34 in any suitable manner, which may be by a system of passages and ducts such as shown in Figs. 1 and 2. The oil between the bearing surface 33 and the shaft 34 flows to the end of the bearing and then radially outward between the thrust collar 35 and the thrust surface 36 to lubricate the thrust surface. This oil flows over the outer periphery of the thrust collar 35, and at normal operating speed substantially all of the oil thus escaping from the bearing is thrown off by the oil thrower 37, and drains to the bottom of the bearing housing from which it can be removed as shown in Figs. 1 and 2. If the shaft is rotating at low speed, however, or in an inclined position, a substantial part of this oil may travel over the oil thrower 37 without being thrown off. Most of the oil passing over the oil thrower 37 in this way is caught by the baffle 39, which has close running clearance with the thrust collar 37 and which prevents most of the oil from passing beyond it. At very slow speeds, however, or in an inclined position of the shaft, some of the oil will get past the baffle 39 and will be thrown off by the oil thrower 38, which has a greater diameter than the oil thrower 37, so that it develops greater cenrifugal force at its periphery and is effective at a lower speed of the shaft than the oil thrower 37.

If the shaft is operating at very low speed, however, or if the shaft is in an inclined position, a small amount of oil may travel over the oil thrower 38, and such oil is wiped off by the oil wiper 42. Oil wiped off in this way and dripping from the oil wiper is caught in the trough 40 which drains it to the bottom of the bearing housing and prevents it from dripping on the shaft. Oil travelling over the oil thrower 38 when the shaft is at rest drains into the trough 41 and may collect in it without draining off. Such oil is thrown off by the lip 41, which acts as an oil thrower, as soon as the shaft starts to rotate, and oil thrown off in this way, as well as oil thrown against the interior of the cover 31 by the oil thrower 38, drains into the trough 49, which keeps it from dripping on the shaft 34 and drains it to the bottom of the housing 30.

Thus it will be seen that the construction of Figs. 4 and 5 provides a combined thrust and journal bearing which completely prevents any leakage of oil from the bearing housing under any conditions of operation by providing means additional to the usual oil thrower for removing any oil which may travel over the oil thrower under any conditions, and thus prevents such oil from travelling along the shaft and escaping from the bearing housing.

Two specific embodiments of the invention have been shown for the purpose of illustration, but it will be apparent that the invention can be embodied equally well in various other constructions, and it is to be understood, therefore, that the invention is not limited to the particular structural details shown, but in its broadest aspects, it includes all equivalent modifications and embodiments which come within the scope of the appended claims.

I claim as my invention:

1. In combination, a rotatable shaft, a bearing for said shaft, a thrust collar on the shaft adapted to engage an end surface of the bearing, a first radial flange on the thrust collar for throwing off oil flowing over the thrust collar from the bearing, a second radial flange axially spaced from the first radial flange, said second radial flange being of larger diameter than the first radial flange, a baffle member between said radial flanges, said baffle member encircling the thrust collar wtih a small clearance, and means adjacent said second radial flange on the side thereof away from the bearing for removing any oil which travels over the flange without being thrown off.

2. In combination, a rotatable shaft, a bearing for said shaft, a thrust collar on the shaft adapted to engage an end surface of the bearing, a first radial flange on the thrust collar adjacent the bearing for throwing off oil flowing over the thrust collar from the bearing, a second radial flange at the end of the thrust collar away from the bearing, said second radial flange being of larger diameter than the first radial flange, a baffle member between said radial flanges, said baffle member encircling the thrust collar with a small clearance, and an oil wiper adjacent the end of the thrust collar away from the bearing, said oil wiper engaging the second radial flange to wipe off any oil which travels over the flange without being thrown off.

3. In combination, a rotatable shaft, a bearing for said shaft, means for supplying oil to said bearing, a radial flange on the shaft for throwing off oil escaping from the bearing, and an oil wiper mounted adjacent said flange at the side thereof away from the bearing, said oil wiper engaging the radial surface of the flange at the periphery thereof to wipe off any oil which travels over the flange without being thrown off, the area of contact between the oil wiper and said radial surface being small compared to the area of the radial surface.

4. In combination, a rotatable shaft, a bearing housing encircling said shaft, a bearing for the shaft supported in said bearing housing, means for supplying oil to said bearing, a radial flange on the shaft for throwing off oil escaping from the bearing, and an oil wiper mounted in the bearing housing adjacent said flange at the side thereof away from the bearing, said oil wiper engaging the radial surface of the flange adjacent the periphery thereof to wipe off any oil which travels over the flange without being thrown off, the area of contact between the oil wiper and said radial surface being small compared to the area of the radial surface.

5. In combination, a rotatable shaft, a bearing for said shaft, means for supplying oil to said bearing, a radial flange on the shaft for throwing off oil escaping from the bearing, and a non-metallic oil wiper mounted adjacent said flange at the side thereof away from the bearing, said oil wiper being mounted below the horizontal central plane of the shaft and engaging the radial surface of the flange at the periphery thereof to wipe off any oil which travels over the flange without being thrown off, the area of contact between the oil wiper and said radial surface being small compared to the area of the radial surface.

6. In combination, a rotatable shaft, a bearing for said shaft, means for supplying oil to said bearing, a radial flange on the shaft for throwing off oil escaping from the bearing, and a pair of non-metallic oil wipers mounted adjacent said flange at the side thereof away from the bearing, said oil wipers being mounted on opposite sides of the shaft below the horizontal central plane of the shaft, and each of said oil wipers engaging the radial surface of the flange at the periphery thereof to wipe off any oil which travels over the flange without being thrown off, the area of contact between each of the oil wipers and said radial surface being small compared to the area of the radial surface.

GERHARD P. LESSMANN.